(12) United States Patent
Pfister et al.

(10) Patent No.: US 11,052,607 B2
(45) Date of Patent: Jul. 6, 2021

(54) POWDER MODULE FOR AN APPARATUS FOR ADDITIVELY MANUFACTURING THREE-DIMENSIONAL OBJECTS

(71) Applicant: CONCEPT LASER GMBH, Lichtenfels (DE)

(72) Inventors: Frank Pfister, Zapfendorf (DE); Moritz Beck, Bamberg (DE); Sarah Ulbrich, Bad Staffelstein (DE)

(73) Assignee: CONCEPT LASER GMBH, Lichtenfels (DE)

( * ) Notice: Subject to any disclaimer, the term of this patent is extended or adjusted under 35 U.S.C. 154(b) by 147 days.

(21) Appl. No.: 16/294,918

(22) Filed: Mar. 7, 2019

(65) Prior Publication Data

US 2020/0238616 A1 Jul. 30, 2020

(51) Int. Cl.
| | |
|---|---|
| B29C 64/245 | (2017.01) |
| B29C 64/153 | (2017.01) |
| B29C 64/165 | (2017.01) |
| B33Y 30/00 | (2015.01) |
| B33Y 40/00 | (2020.01) |
| B29C 64/30 | (2017.01) |
| B29C 64/232 | (2017.01) |
| B22F 10/20 | (2021.01) |
| B33Y 10/00 | (2015.01) |
| B29C 64/371 | (2017.01) |
| B22F 10/30 | (2021.01) |

(52) U.S. Cl.
CPC ........... *B29C 64/245* (2017.08); *B22F 10/20* (2021.01); *B29C 64/153* (2017.08); *B29C 64/165* (2017.08); *B29C 64/232* (2017.08); *B29C 64/30* (2017.08); *B22F 10/30* (2021.01); *B22F 2201/11* (2013.01); *B29C 64/371* (2017.08); *B33Y 10/00* (2014.12); *B33Y 30/00* (2014.12); *B33Y 40/00* (2014.12)

(58) Field of Classification Search
None
See application file for complete search history.

(56) References Cited

U.S. PATENT DOCUMENTS

| | | | |
|---|---|---|---|
| 5,753,274 A | * | 5/1998 | Wilkening ............. B23K 26/34 |
| | | | 425/174.4 |
| 6,554,600 B1 | | 4/2003 | Hofmann et al. |
| 2007/0026099 A1 | | 2/2007 | Hagiwara |
| 2016/0318253 A1 | | 11/2016 | Barnhart |

FOREIGN PATENT DOCUMENTS

| | | |
|---|---|---|
| DE | 102011119338 A1 | 5/2013 |
| EP | 3103569 A1 | 12/2016 |

OTHER PUBLICATIONS

European Search Report Corresponding to EP19153790 dated Jul. 23, 2019.

* cited by examiner

*Primary Examiner* — Mary Lynn F Theisen
(74) *Attorney, Agent, or Firm* — Dority & Manning, P.A.

(57) ABSTRACT

Powder module (1) for an apparatus (2) for additively manufacturing three-dimensional objects, which powder module (1) comprises a holding device (5) adapted to hold a build plate (3) of the powder module (1), wherein the holding device (5) comprises at least one clamping unit (6) connectable with and disconnectable from a recess (7) in the build plate (3), wherein the clamping unit (6) is moveable between a first position in which the clamping unit (6) is connected with the build plate (3) and a second position in which the clamping unit (6) is disconnected from the recess (7).

20 Claims, 2 Drawing Sheets

POWDER MODULE FOR AN APPARATUS FOR ADDITIVELY MANUFACTURING THREE-DIMENSIONAL OBJECTS

CROSS-REFERENCE TO RELATED APPLICATIONS

This application claims priority to European Patent Application serial no. 19 153 790.1 filed Jan. 25, 2019, the contents of which is incorporated herein by reference in its entirety as if set forth verbatim.

The invention relates to a powder module for an apparatus for additively manufacturing three-dimensional objects, which powder module comprises a holding device adapted to hold the build plate of the powder module.

Powder modules for the use in additive manufacturing apparatuses are generally known from prior art. Usually a powder module provides a build plate onto which build material can be applied to be selectively consolidated to layerwise form the three-dimensional object. As maintaining a defined position of the build plate relative to other components of the apparatus is crucial for object and process quality, holding devices are usually provided that hold the build plate in a defined position. For example, it is possible to hold, in particular clamp, the build plate against a carrying element of the powder module, wherein the carrying element of the powder module can be moved in different positions, e.g. for lowering the build plate.

Further, using screws to hold the build plate in position is known from prior art, e.g. screws protruding the build plate, which screws are screwed into a carrying element, for instance. Hence, it is possible to place the build plate in position, e.g. on the carrying element, wherein screws or other positive locking or force locking connection elements can be used to connect the build plate and hold the build plate in position. After the additive manufacturing process is finished, non-consolidated build material has to be removed from the build plate to gain access to those connection elements in order to release the connection for removing the build plate from the apparatus.

Additionally, the positions of the connection means, e.g. holes in the build plate, have to be taken into calculation, as in the regions of the build plate in which connection elements are arranged to hold the build plate in position, a part of the object cannot be built, as otherwise build material would be consolidated in those regions and the connection elements would not be accessible anymore. Thus, the effective area of the build plate is reduced by the area occupied with the connection elements, which areas cannot be used in the additive manufacturing process. As additionally a "safety area", e.g. for avoiding negative effects on the connection elements, has to be kept around the connection elements, in which the object cannot be built and build material cannot be consolidated, the effective area of the build plate is further reduced.

It is an object of the present invention to provide an improved powder module, in particular improving the handling of the build plate is improved.

The object is inventively achieved by a powder module according to claim 1. Advantageous embodiments of the invention are subject to the dependent claims.

The powder module described herein is a powder module for an apparatus for additively manufacturing three-dimensional objects, e.g. technical components, by means of successive selective layerwise consolidation of layers of a powdered build material ("build material") which can be consolidated by means of an energy source, e.g. an energy beam, in particular a laser beam or an electron beam. A respective build material can be a metal, ceramic or polymer powder. A respective energy beam can be a laser beam or an electron beam. A respective apparatus can be an apparatus in which an application of build material and a consolidation of build material is performed separately, such as a selective laser sintering apparatus, a selective laser melting apparatus or a selective electron beam melting apparatus, for instance. Alternatively, the successive layerwise selective consolidation of build material may be performed via at least one binding material. The binding material may be applied with a corresponding application unit and, for example, irradiated with a suitable energy source, e.g. a UV light source.

The apparatus may comprise a number of functional units which are used during its operation. Exemplary functional units are a process chamber, an irradiation device which is adapted to selectively irradiate a build material layer disposed in the process chamber with at least one energy beam, and a stream generating device which is adapted to generate a gaseous fluid stream at least partly streaming through the process chamber with given streaming properties, e.g. a given streaming profile, streaming velocity, etc. The gaseous fluid stream is capable of being charged with non-consolidated particulate build material, particularly smoke or smoke residues generated during operation of the apparatus, while streaming through the process chamber. The gaseous fluid stream is typically inert, i.e. typically a stream of an inert gas, e.g. argon, nitrogen, carbon dioxide, etc.

As described before, the invention relates to a powder module for an apparatus for additively manufacturing three-dimensional objects. For example, the powder module may refer to a module of the apparatus which receives the object during the additive manufacturing process, e.g. providing a carrying element that carries the powder bed and the object. The powder module may be a separate module which can be connected with the apparatus and disconnected from the apparatus. It is also possible that the powder module is an integrated component of the apparatus.

The invention is based on the idea that the holding device of the powder module comprises at least one clamping unit connectable with and disconnectable from a recess in the build plate, wherein the clamping unit is movable between a first position in which the camping unit is connected with the build plate and a second position in which the clamping unit is disconnected from the recess. Thus, the build plate to which the clamping unit has to be connected to hold the build plate in position, provides a recess for at least one clamping unit of the holding device of the powder module.

In other words, it is possible that the clamping unit of the holding device may be connected with the recess for holding the build plate in position. By moving the clamping unit between the first position and the second position, it is possible to disconnect the clamping unit from the recess and connect the clamping unit with the recess. Hence, it is possible to hold the build plate with the clamping unit in the first position and release the build plate by moving the clamping unit to the second position in which the clamping unit is disconnected from the recess and the build plate may be removed from the powder module, for example.

Thus, it is not necessary to remove non-consolidated build material before the build plate may be released, but it is possible to release the build plate by moving the clamping unit out of the recess in the build plate. Therefore, it is possible to automatically perform a release process of the build plate or automatically hold the build plate in place.

For example, it is possible to automatically connect the clamping unit with the build plate by moving the clamping unit from the second position to the first position in which the build plate is held via the holding device. It is also possible to automatically release the build plate by moving the clamping unit from the first position to the second position in which the clamping unit is disconnected from the recess in the build plate and therefore, the build plate may be removed from the powder module. Therefore, it is not necessary that personnel, e.g. an operator, removes the build material from the build plate to reach the connection elements and, for example, unscrew the screws holding the build plate in position.

According to an embodiment of the inventive powder module, the holding device may be adapted to engage with and disengage from the build plate without an interaction with the upper surface of the build plate facing the process chamber. The term "process chamber" may refer to a chamber of the apparatus the build plate faces in an operational state in which build material may be applied onto the build plate. As the recess may be arranged in arbitrary positions on the build plate, in particular in a position different from the top surface onto which build material is applied in the additive manufacturing process, the effective area of the build plate is not reduced, as, for example, the recess may be arranged on a lower surface, e.g. the surface facing the carrying element. Hence, the connection between the holding device and the build plate can be disconnected and connected arbitrarily without interfering with the upper surface of the build plate onto which the build material is applied and on which the object is additively manufactured.

Further, it is possible to connect and disconnect the build plate without the need to consider the influences of the current conditions present in the process chamber and the impact on the build plate. For example, due to the thermal variations in the process chamber, especially throughout the manufacturing process, deformations of the build plate surface are likely to occur. If the build plate is held in place via connection means protruding or interacting with the upper surface of the build plate that faces the process chamber deformations can occur that may have a negative impact on the handling of the build plate, since the build plate may not be disconnected from or connected with the build plate dependent on the current deformation of the build plate. By interacting with the recess in the build plate that is not arranged in an upper part of the build plate, in particular not in the top surface of the build plate, negative influences on the build plate, such as the thermal deformation or the like, can significantly be reduced or even entirely avoided.

Particularly, it is possible that that the holding device is adapted to disengage the build plate after the additive manufacturing process is finished and before the non-consolidated build material is removed from the build plate. Hence, it is not necessary to firstly remove the non-consolidated build material to gain access to the connection means that hold the build plate in place, but it is possible to release the build plate independent of build material resting on the top surface of the build plate. Thus, it is also possible that the clamping unit may disengage from the recess in the build plate and that the build plate can be lifted before the build material is entirely removed.

According to another embodiment of the inventive powder module, the holding device may comprise a moving unit adapted to move the clamping unit, particularly controlled via a control unit. The moving unit is adapted to move the clamping unit, particularly between the first position and the second position. Hence, it is possible to engage and disengage the connection between the clamping unit and the build plate, in particular the recess in the build plate, via the moving unit. The moving unit is, for example, controlled via a control unit that may be connected with the additive manufacturing apparatus or any other functional unit involved in the additive manufacturing process such as a handling station, a pre-processing station or a post-processing station, e.g. for holding the build plate or releasing the build plate, especially in process steps of the additive manufacturing process in which the build plate is inserted into or removed from the apparatus.

Particularly, it is possible that the moving unit is adapted to move the clamping unit between the first and the second position via a translatory and/or a rotational movement. Inter alia, it is possible that the clamping unit comprises an edge or a projection that engages with the recess in the first position. Thus, by moving the clamping unit between the first and second position it is possible to move the edge or projection into the recess or out of the recess. The movement of the clamping unit can be performed via a translatory movement or a rotational movement or an arbitrary combination of both. Of course, it is also possible that the translatory movement and/or the rotational movement is composed of different directional components, e.g. a directional component moving the clamping unit upwards and/or downwards and in a perpendicular plane. Additionally or alternatively it is also possible that the clamping unit is rotated about one or more rotational axes, e.g. the projection may be moved in a vertical direction and rotated in a perpendicular plane.

The moving unit may further be adapted to move the at least one clamping unit in a vertical direction and in a horizontal direction or a rotational direction with respect to a build plane provided via the build plate or the plane of a carrying element. As described before, it is possible to move the clamping unit via a moving unit, wherein the clamping unit may be moved in a translatory movement, e.g. linearly. The translatory movement may comprise movement components in a vertical direction and in a horizontal direction, e.g. upwards and downwards and in a plane perpendicular thereto, e.g. essentially parallel to the top surface of the build plate. Further, it is possible to move the clamping unit in a rotational direction, e.g. rotate the clamping unit about at least one rotational axis.

According to another embodiment of the inventive powder module, the moving unit may be adapted to apply a force onto the build plate for pressing the build plate against the carrying element. As described before, the build plate may rest on a carrying element that carries the build plate and positions the build plate inside the additive manufacturing apparatus or inside the powder module, respectively. For example, it is possible that by lowering the carrying element which may be connected to a respective movement mechanism, the position of the build plate can be adjusted in a vertical direction. Particularly, it is possible to successively lower the build plate after a previously applied layer of build material has been selectively consolidated to provide an empty space in which a fresh layer of build material can be applied onto the previously processed layer.

In order to ensure that the build plate is properly positioned on the carrying element, the moving unit can be adapted to apply a force onto the build plate via which the build plate is pressed against the carrying element. The moving unit may apply a force via the at least one clamping unit being engaged with the recess in the build plate. For example, as already described before, the at least one clamping unit may provide an edge or a projection that engages with the recess in the build plate. This connection can be used to pull or push, i.e. move, the build plate against the carrying element and thereby apply the force that is used to hold the build plate in position.

The moving unit may also be adapted to lift the build plate via the at least one clamping unit by moving the clamping unit in a vertical direction. Thus, it is not only possible that the moving unit can "pull" the build plate against the carrying element on which it is positioned, but it is also possible to move the build plate in a direction away from the carrying element, e.g. "upwards". By moving the clamping unit in a vertical direction, e.g. upwards, it is possible to move the build plate out of the powder module, e.g. for facilitating a removal of the build plate from the powder module.

In general, the moving unit may be driven by arbitrary drive means, particularly it is possible that the moving unit is built as electromechanical or hydraulical or pneumatical moving unit. Of course, an arbitrary combination of different types of drive units is also possible, e.g. a combination of an electromechanical and a hydraulical drive means.

According to another embodiment of the inventive powder module, the holding device may comprise at least two clamping units, particularly arranged symmetrically, in particular symmetric to a center of the build plate or the carrying element. By arranging at least two clamping units in defined positions relative to the build plate, it is possible to further improve holding the build plate in place. In particular, it is possible to symmetrically apply a force on the build plate to hold the build plate in position.

As described before, the at least one recess in the build plate may be arranged in any arbitrary position on the build plate, wherein it is advantageous, if the recess is arranged in a lower region of the build plate, e.g. accessible from a side of the build plate that faces away from the process chamber. Particularly, the at least one recess may be covered by an edge of the build plate, wherein the recess is displaced towards the center of the build plate, particularly arranged below a corner of the build plate. Thus, it is possible that the build plate, e.g. a rectangular plate, comprises a recess that is covered by an edge of the build plate. In other words, the recess may be accessible from below the build plate, wherein the recess is arranged in a region of the build plate that is displaced with respect to an outer edge of the build plate.

The displacement of the recess with respect to the outer edge of the build plate may be positioned towards the center of the build plate in that the clamping unit may interact with the recess while the build plate is arranged inside the powder module. For example, it is possible to arrange the recess below a corner of the build plate. Thus, the movement of the clamping unit between the first and the second position may at least partially involve a rotational movement or a translatory movement from the direction of the corner of the build plate towards the center of the build plate or from an edge of the build plate towards the center of the build plate and vice versa.

Further, it is possible that the build plate comprises a recess arranged at each corner of the build plate. Hence, it is possible to symmetrically apply the force needed for holding the build plate in position by applying the force at each corner of the build plate via a clamping unit engaging with a corresponding recess.

It is further possible that at least two clamping units are coupled via a coupling element. Thus, it is possible to couple at least two clamping units with each other and therefore, realizes a coupled movement of the clamping units. Hence, it is assured that the clamping units are moved symmetrically and synchronously, as the coupling element couples the clamping units to each other and avoids a non-symmetric movement and connection or disconnection of the clamping unit with or from the build plate. Therefore, a non-symmetric application of a holding force can be avoided.

Besides, the invention relates to an apparatus for additively manufacturing three-dimensional objects comprising an inventive powder module. The invention relates further to a method for operating a powder module for an apparatus for additively manufacturing three-dimensional objects, in particular an inventive apparatus, comprising a powder module with a carrying element carrying a build plate, wherein a clamping unit is connected with or disconnected from a recess in the build plate, wherein the clamping unit is moved between a first position in which the clamping unit is connected with the build plate and a second position in which the clamping unit disconnected from the recess.

Self-evidently, all details, features and advantages described with respect to the inventive powder module are fully transferable to the inventive apparatus and the inventive method.

Exemplary embodiments of the invention are described with reference to the Fig. The Fig. are schematic diagrams, wherein FIG. 1 shows an inventive apparatus for additively manufacturing three-dimensional objects with an inventive powder module;

Figure 1:
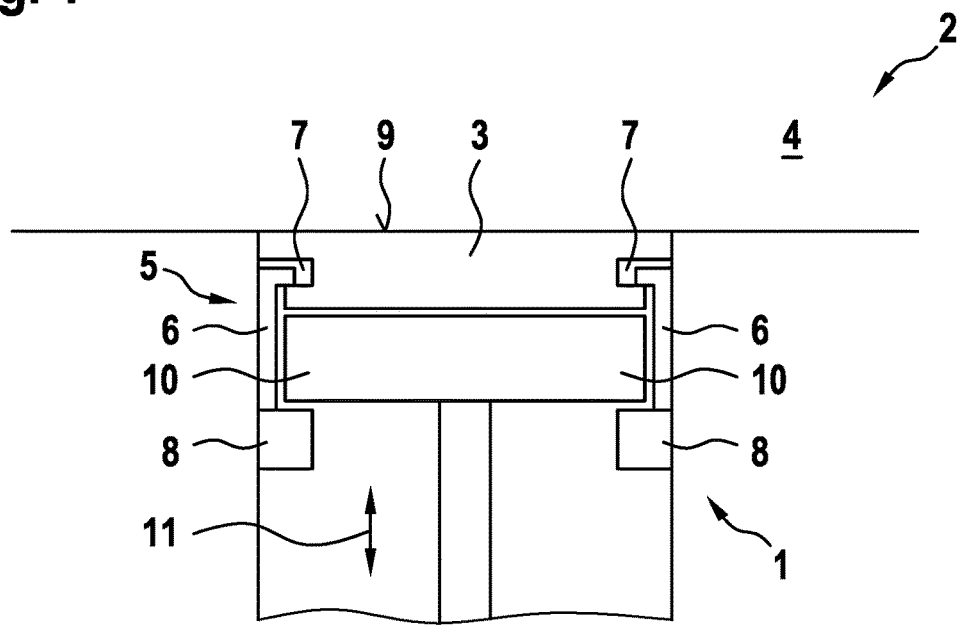

FIG. 1 shows a powder module 1 arranged in an apparatus 2 for additively manufacturing three-dimensional objects. The powder module 1 provides a build plate 3 on which build material can be applied inside a process chamber 4 of the apparatus 2. The applied build material can subsequently be successively layerwise selectively consolidated to layer by layer build the three-dimensional object.

The powder module 1 comprises a holding device 5 that is adapted to hold the build plate 3 in position, particularly inside the powder module 1. The holding device 5 comprises multiple clamping units 6, e.g. four clamping units 6, wherein it is possible to connect the clamping units 6 with recesses 7 in the build plate 3 or disconnect the clamping units 6 from the recesses 7 in the build plate 3. To perform the engagement/disengagement or the connection and disconnection of the clamping units 6 with/from the recesses 7, a moving unit 8 is provided that is adapted to move the clamping units 6. In this exemplary embodiment, multiple moving units 8 are depicted, wherein it is, of course, also possible to have one common moving unit 8 that is adapted to (individually) move the clamping units 6.

In the situation that is depicted in FIG. 1, the clamping units 6 are connected with the build plate 3, e.g. the clamping units 6 are arranged in a first position in which the clamping units 6 are connected with the build plate 3. Hence, it is possible to move the clamping units 6 to a second position in which the clamping units 6 are disconnected from the recesses 7. As can further be derived from FIG. 1, the interaction of the clamping units 6 with the build plate 3, in particular the recesses 7, is performed from below the build plate 3 with respect to a top surface 9 facing the process chamber 4.

By moving the clamping units 6 to the first position, it is possible to hold the build plate 3 in place, wherein it is also possible to apply a force onto the build plate 3 pressing the build plate 3 against the carrying element 10 on which the build plate 3 rests or via which the build plate 3 is carried. Of course, the carrying element 10 is height-adjustable which is indicated via arrow 11 in that build material can layerwise be applied on the surface 9 or a previously applied layer carried via the build plate 3, wherein after a selective consolidation process of the current layer is finished, the carrying element 10 and therefore, the build plate 3 can be lowered to provide room for an additional layer of build material to be applied.

Figure 2:
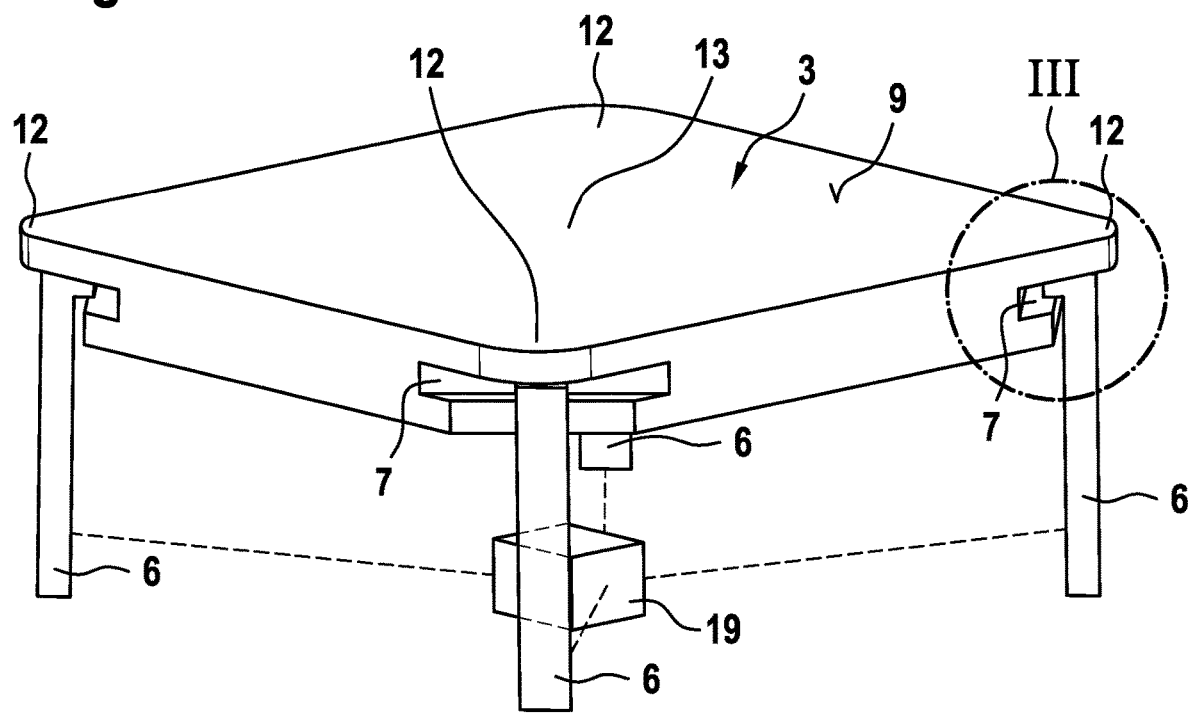
FIG. 2 shows a detailed view of the powder module of FIG. 1.

FIG. 2 depicts the build plate 3 and the clamping units 6 in a perspective view, wherein for the sake of simplicity other components of the powder module 1 are omitted, such as the carrying element 10, the moving units 8 and the like. As can be derived from FIG. 2, the clamping units 6 engage the recesses 7 which are arranged below corners 12 of the build plate 3. The recesses 7 are displaced towards a center 13 of the build plate 3, wherein the recesses 7 are covered by the edges, in particular the corners 12 of the build plate 3. In this exemplary embodiment, the holding device 5 comprises four clamping units 6 that are symmetrically arranged with respect to the center 13 of the build plate 3, namely below the corners 12 of the build plate 3.

Figure 3:
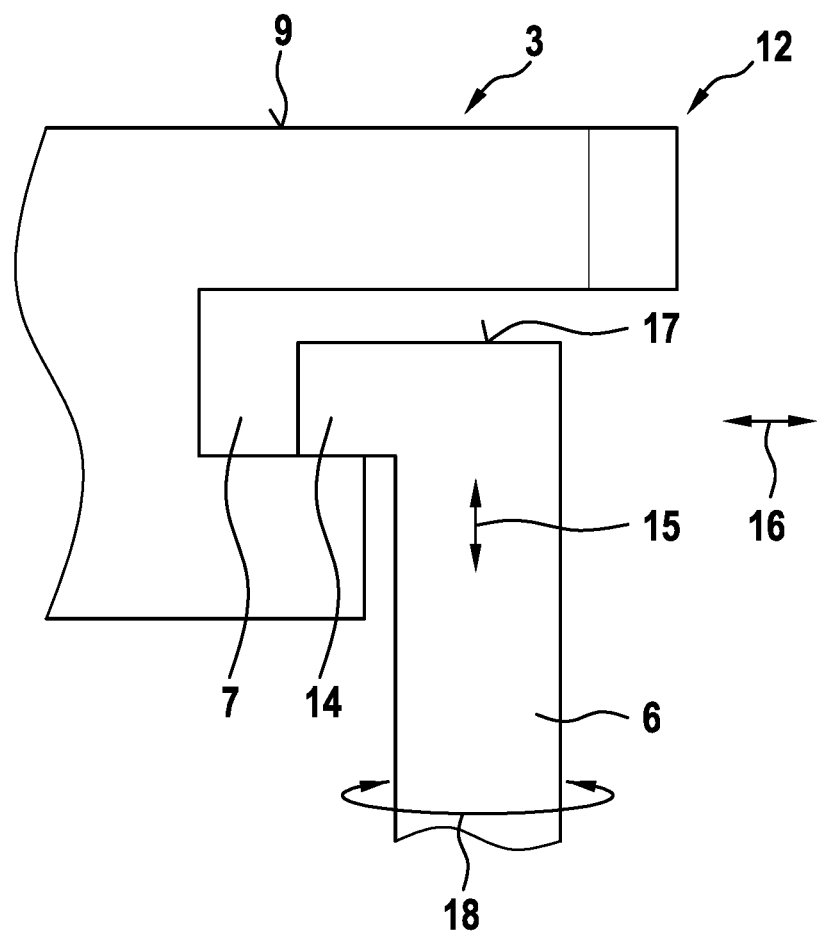
FIG. 3 shows the detail III of FIG. 2.

The detail III, which is depicted in FIG. 3, shows that each clamping unit 6 comprises a projection 14 that engages the corresponding recess 7. For example, it is possible to move the clamping unit 6 vertically, as indicated via arrow 15 and in a plane perpendicular to the vertical movement, as indicated via arrow 16. Hence, it is possible to move the projection 14 into the recess 7 and out of the recess 7 to connect the clamping unit 6 with the build plate 3 or disconnect the clamping unit 6 from the build plate 3, respectively. Further, in the situation that is depicted in FIG. 3, it is also possible to vertically move the clamping units 6, e.g. downwards, to pull the build plate 3 against the carrying element 10 to assure that the position of the build plane 3 is properly maintained. Besides, it is also possible to lift the build plate 3 by vertically moving the clamping unit 6 upwards until the upper surface 17 of the clamping unit 6 comes in contact with the bottom surface of the build plate 3. Thereby, it is possible to lift the build plate 3, e.g. to facilitate a removal of the build plate 3 out of the powder module 1.

As indicated via arrow 18 it is also possible to use clamping units 6 that can be rotated about a vertical rotational axis, to rotate the projection 14 into the recess 7 and out of the recess 7. Of course, an arbitrary combination of different modes of moving the clamping units 6, such as a vertical movement, as indicated via arrow 15 combined with a rotational movement, as indicated via arrow 18 is possible. As described before, it is also possible to combine the movements as indicated via arrows 15, 16 by vertically moving the clamping unit 6 and moving the clamping unit 6 in a plane perpendicular to the vertical movement direction. It is also possible to combine all movements, as indicated via arrows 15, 16 and 18.

As can be derived from the Fig., it is possible to engage and disengage, in particular release or hold the build plate 3 in position without an interaction with the upper surface 9 of the build plate 3. Hence, it is possible to disengage and release the build plate 3 after an additive manufacturing process is finished and before non-consolidated build material has been removed from the upper surface 9. Further, the entire area of the build plate 3 can be used, as it is not necessary to reserve regions for connection elements used to connect the build plate 3 with the carrying element 10. Although not explicitly depicted, the moving units 8 that are adapted to move the clamping units 6 can be controlled via a control unit. The moving units 8 can, inter alia, be built as electromechanical or hydraulical or pneumatical moving units 8.

Further, FIG. 2 depicts a coupling element 19 (optional) by which the clamping units 6 can be coupled to each other. Hence, the movements of the individual clamping units 6 can be performed synchronously and symmetrically with respect to the center 13 of the build plate 3, as the coupling element 19 assures that the relative distances between, e.g. opposing clamping units 6 are equalized.

Self-evidently, the method may be performed on the inventive powder module and the inventive apparatus.

The invention claimed is:

1. A powder module for an apparatus for additively manufacturing three-dimensional objects, the powder module comprising:
   a carrying element configured to receive a build plate, the build plate supporting powder material that is selectively consolidated during an additive manufacturing process to additively manufacture a three-dimensional object;
   one or more clamping units configured to clamp the build plate to the carrying element; and
   one or more moving units configured to move the one or more clamping units between an unclamped position and a clamped position, the unclamped position comprising the one or more clamping units being disconnected from the build plate, and the clamped position comprising the one or more clamping units being connected with respective ones of a corresponding one or more recesses in the build plate.

2. The powder module of claim 1, wherein the one or more recesses are located within a respective corner of the build plate.

3. The powder module of claim 1, wherein the one or more recesses are located at an elevation below an upper surface of the build plate, the upper surface extending over the one or more recesses.

4. The powder module of claim 1, wherein selectively consolidating the powder material results in unconsolidated powder material at least partially surrounding the three-dimensional object, the three-dimensional object and the unconsolidated powder material being supported by the build plate; and
   wherein the one or more moving units are configured to move the one or more clamping units from the clamped position to the unclamped position after the additive manufacturing process and before removing the consolidated build material from the build plate.

5. The powder module of claim 1, wherein the one or more moving units are configured to move the respective ones of the one or more clamping units between the unclamped position and the clamped position at least in part by a translatory movement and/or a rotational movement.

6. The powder module of claim 1, wherein the one or more moving units are configured to move the respective ones of the one or more clamping units in a vertical direction and in a horizontal direction, or wherein the one or more moving units are configured to move the respective ones of the one or more clamping units in a rotational direction.

7. The powder module of claim 1, wherein the one or more moving units are configured to apply a force onto the respective ones of the one or more clamping units, the force causing the one or more clamping units to press the build plate downwardly against the carrying element.

8. The powder module of claim 1, wherein the one or more moving units are configured to cause the respective ones of the one or more clamping units to lift the build plate away from the carrying unit at least in part by the one or more moving unit moving the respective ones of the one or more clamping units in a vertical direction.

9. The apparatus of claim 8, wherein the one or more clamping elements respectively comprise an upper surface, the upper surface configured to contact a bottom surface of the build plate with the respective one of the one or more recesses corresponding to the respective clamping element when a respective one of the one or more moving units moves the respective ones of the one or more clamping units in a vertical direction, the upper surface lifting the build plate away from the carrying unit.

10. The powder module of claim 1, wherein the one or more moving units are configured to move the respective ones of the one or more clamping units by way of electro-mechanical action, hydraulic action, or pneumatic action.

11. The powder module of claim 1, wherein the one or more clamping units comprise least two clamping units arranged symmetrically relative to a center point of the carrying element.

12. The powder module of claim 1, wherein the one or more recesses are respectively located below a corner of the build plate and respectively extend inwardly towards the center of the build plate.

13. The powder module of claim 1, wherein one or more clamping elements comprise a plurality of clamping elements, and the one or more recesses comprises a plurality of recesses respectively located at respective ones of a plurality of corners of the build plate, the plurality of clamping elements respectively configured to connected with respective ones of the corresponding plurality of recesses.

14. The powder module of claim 1, wherein the one or more clamping elements comprise a plurality of clamping elements, and wherein the powder module comprises one or more coupling elements, the one or more coupling elements movably coupling the one or more clamping elements to one another; and wherein the one or more moving units are configured to move the plurality of clamping elements synchronously with one another at least in part by the one or more coupling elements movably coupling the one or more clamping elements to one another.

15. The powder module of claim 14, wherein the one or more moving units are configured to move the plurality of clamping elements synchronously with respect to the center of the build plate.

16. The powder module of claim 1, wherein the one or more moving units are configured to move the plurality of clamping elements synchronously with respect to the center of the build plate.

17. The apparatus of claim 1, wherein the one or more clamping elements respectively comprise an extension member, the extension member configured to rotate into a respective one of the one or more recesses when a respective one of the one or more moving units moves the respective one of the one or more clamping elements from the unclamped position to the clamped position.

18. An apparatus for additively manufacturing three-dimensional objects, the apparatus comprising:
a process chamber; and
a powder module, the powder module comprising:
a carrying element configured to receive a build plate, the build plate supporting powder material that is selectively consolidated during an additive manufacturing process to additively manufacture a three-dimensional object;
one or more clamping units configured to clamp the build plate to the carrying element; and
one or more moving units configured to move the one or more clamping units between an unclamped position and a clamped position, the unclamped position comprising the one or more clamping units being disconnected from the build plate, and the clamped position comprising the one or more clamping units being connected with respective ones of a corresponding one or more recesses in the build plate;
wherein the powder module is configured to position the build plate with a top surface of the build plate oriented towards the process chamber.

19. The apparatus of claim 18, comprising the build plate.

20. The apparatus of claim 18, wherein the one or more moving units are configured to move the respective ones of the one or more clamping units between the unclamped position and the clamped position at least in part by a translatory movement and/or a rotational movement.

* * * * *

UNITED STATES PATENT AND TRADEMARK OFFICE
CERTIFICATE OF CORRECTION

PATENT NO. : 11,052,607 B2
APPLICATION NO. : 16/294918
DATED : July 6, 2021
INVENTOR(S) : Frank Pfister, Moritz Beck and Sarah Ulbrich It is certified that error appears in the above-identified patent and that said Letters Patent is hereby corrected as shown below:

On the Title Page

Item (30), should read:
-- (30)  Foreign Application Priority Data
Jan. 25, 2019 (EP) ...................... 19153790.1 --.

Signed and Sealed this
Fifth Day of October, 2021

Drew Hirshfeld
*Performing the Functions and Duties of the*
*Under Secretary of Commerce for Intellectual Property and*
*Director of the United States Patent and Trademark Office*